United States Patent Office 3,692,598
Patented Sept. 19, 1972

3,692,598
CASTABLE NITRATE PROPELLANTS
Wallace W. Thompson, Tarzana, Calif., assignor to
North American Aviation, Inc.
No Drawing. Filed Oct. 5, 1966, Ser. No. 584,945
Int. Cl. C06d 5/06
U.S. Cl. 149—19
5 Claims This invention relates to the curing of polymeric compositions. This invention further relates to the curing of prepolymers containing terminal or substituted carboxy functional groups when said prepolymers are in the presence of nitrate compounds.

In the manufacture of solid rocket propellant, a polymeric substance is frequently employed as a binder to hold together fuel and oxidizer compounds of the propellant. The binder may, of course, supply fuel or oxidizer elements itself. Certain of the polymeric binders are prepared from carboxy terminated or substituted prepolymers. The addition of curing agents to these prepolymers causes cross-linking between the functional groups of the prepolymer, resulting in a polymer. The polymer's physical properties vary with the degree of cross linkage. This degree can be varied by the amount and type of curing agent added. In general, it is desired to cure the prepolymers to a degree such that the resulting polymer has the physical properties of an elastomer. Examples of prior art curing agents are tris-methyl aziridinyl phosphine oxide, triethylene melamine, tripropylene melamine, and nitrolotriethyl-$\beta$-ethylene iminobutyrate.

It is usually desired to suspend other compounds in the polymeric binder composition. For instance, a solid rocket propellant composition could comprise such a polymer having particulate fuel and oxidizer suspended in it. Examples of suitable fuels would be light metals and light metal hydrides. Examples of suitable oxidizers would be perchlorates and permanganates.

Some of the most desirable oxidizers, however, cannot be included in carboxy substituted or terminated prepolymers to be cured by prior art curing agents. It has been surprisingly found that the inclusion of a nitrate oxidizer compound in carboxy terminated or substituted prepolymer compositions unexpectedly prevents their curing by prior art curing agents.

It is therefore an object of this invention to provide a method for curing prepolymers.

It is a further object of this invention to provide a curing method for compositions containing prepolymers and nitrate compounds.

It is a still further object of this invention to provide a curing method for carboxy terminated and substituted prepolymers in the presence of nitrate compounds.

It is an additional object of this invention to provide novel polymer compositions.

Other objects and many attendant advantages will be evident from the following description.

The objects of this invention are accomplished by using a compound selected from the group consisting of hexa (1-aziridinyl) triphosphatriazine (HAT), hexa 1-(2-methyl) arizidinyl triphosphatriazine (HMAT), and mixtures thereof, as the curing agent for carboxy terminated and substituted prepolymers that are in the presence of nitrate compounds.

Nitrate salts, as used in this description, include both organic and inorganic salts. Examples are ammonium nitrate, potassium nitrate, sodium nitrate, lithium nitrate, guanidinium nitrate, urea nitrate, magnesium nitrate, calcium nitrate, barium nitrate, hydroxylammonium nitrate, hydrazinium nitrate, and mixtures of these nitrate compounds.

Examples of carboxy terminated and substituted prepolymer binders suitably cured according to the teachings of this invention are linear polybutadienes with terminal carboxy groups, carboxy terminated polyesters, carboxy terminated polyethers, carboxy terminated polyoxymethylenes, copolymers of butadiene and acrylic acid, copolymers of butadiene and acrylonitrile, and copolymers of styrene and maleic anhydride.

In general, the curing compounds of the instant invention are used as are prior art curing agents. Their distinguishing functional characteristic is that they cure the named binders in the presence of nitrates; prior art curing agents do not. It is preferred that the instant curing agents be present in the composition in quantities ranging from about 0.5 percent to about 3 percent, by weight of the composition. When the described carboxy prepolymers are in the presence of more than about ten percent by weight of a nitrate salt, the addition of prior art curing agents does no cure the prepolymer. However, when the curing agents of the instant invention are used, a definite and advantageous curing effect is noted in carboxy prepolymer compositions containing from 10 percent to as much as about 90 percent by weight nitrate salts. It is preferred that the prepolymer compositions contain from about 9 to about 87 percent, by weight of the composition, of carboxy terminated or substituted prepolymer.

In preparing formulations, the curing compound of the invention is suitably mechanically mixed with the prepolymer to be cured. Curing temperatures between about 10° C. and about 150° C. can be used. Curing temperatures between about 20° C. and 40° C. are preferred. Curing typically takes between about 20 and about 100 hours.

It is well known that the degree of cross linkage, or polymerization, in a polymer may be affected by the amount of curing agent used to cure the polymer. In general, when more curing agent is used, more cross linkage is found, and the polymer is harder and less elastic. For solid rocket propellant compositions, it is generally desirable that the composition be capable of at least about 10 percent elongation at maximum stress, and about 40 percent would be more desirable. In curing carboxy terminated or substituted prepolymers with the curing agents of the instant invention, a polymer of suitable elasticity is achieved with a reacted imine to carboxyl ratio of about 1 to 1. It has been found that this ratio is achieved when about ⅓ as many moles of either HMAT or HAT as moles of the active carboxyl group in the prepolymer are used.

In addition to the carboxy terminated or substituted prepolymers, the nitrate salts, and the HMAT or HAT curing agent previously described, a propellant composition can also include other compounds typically included in solid propellant compositions. It does not appear that the inclusion or exclusion of such other typical compounds affects the surprising relationships between the critical three components of the instant invention. For instance, additional fuel material such as light metals and light metal hydrides can be present in a propellant mixture. Examples of such fuels would be aluminium, aluminium hydride, beryllium, and beryllium hydride. Heavier metal fuels, such as boron, magnesium, and zirconium can also be included. The preferred range of content of these other fuels is from about 3 to about 25 percent, by weight. Oxidizers in addition to nitrates can also be present. For instance, metal perchlorates whose metal is selected from Groups I-A, I-B and II-A can also be in the composition. The inclusion in propellant formulations of such perchlorates, such as lithium perchlorate, beryllium perchlorate, and silver perchlorate, is known in the prior art. Prior art plasticizers can also be present in the composition. Eaxmples of such plasticizers are mineral oil, dioctylazelate, isodecyl pelargonate, trimethylolethanetrinitrate, pentaerythrytol tetranitrate, and 1,3,5,7 - tetranitro-1,3,5,7-tetraazacyclooctane.

EXAMPLE I

Formulations were prepared by mixing aluminium with the prepolymers shown for five to ten minutes. Curative was then added and mixing continued for an additional five minutes, to insure that a uniform product was obtained. Nitrate oxidizer consisting of 68/32 mixture of hydrazine nitrate and ammonium nitrate was then added. Mixing continued for thirty minutes. The mixture was pressed by hand into a plastic mold sealed to prevent reaction with atmospheric moisture, and cured at ambient temperature.

The prepolymers tested included Butarez I, a trade name of Phillips Petroleum Inc. for a carboxy terminated polybutadiene with a carboxy equivalent of 0.028 per 100 g. of prepolymer; Hycar CTPB, trade name of B. F. Goodrich Chemical Co., for a carboxy terminated polybutadiene with a carboxy equivalent of 0.042 per 100 g. of prepolymer; and HX730 CTPE, a Sinclair Petrochemicals, Inc. trademark for a carboxy terminated polyester which has a carboxy equivalent of 0.095 per 100 g. of prepolymer.

The curatives tested included hexakis methylaziridinyl triphosphatriazine (HMAT) and nitrilotriethyl-$\beta$-ethylene iminobutyrate (NTEB).

Some of the results of the tests are tabulated in Table I.

TABLE I

| Mixture number | 1 | 2 | 3 | 4 | 5 | 6 |
|---|---|---|---|---|---|---|
| Component (grams) | | | | | | |
| prepolymer: | | | | | | |
| Butarez I | 2.05 | 2.05 | | | | |
| Hycar (CTPB) | | | 2.00 | 2.00 | | |
| HX730 (CTPE) | | | | | 1.84 | 1.85 |
| Curative: | | | | | | |
| NTEB | .10 | | .15 | | .31 | |
| HMAT | | .10 | | .15 | | .30 |
| Hydrazine-ammonium nitrate oxidizer (68/32) | 12.75 | 12.75 | 12.25 | 12.25 | 12.25 | 12.75 |
| Hours cure | 96 | 96 | 72 | 72 | 72 | 72 |

To determine the extent of cure of the prepolymer, samples of each composition were treated with water to dissolve the oxidizer. The insoluble residue was examined with the following results.

Mix No.:
1—Sticky, incomplete cure
2—good cure
3—sticky
4—good cure
5—discontinuous binder phase, sticky
6—good cure.

It can be seen that the compositions embodying the HMAT curative are cured, while those embodying NTEB are not.

EXAMPLE II

Using the procedure outlined in Example I, the following formulations are produced using hexa(1-aziridinyl) triphosphatriazine, (HAT) as a curing agent and beryllium as a fuel. The results are compared to identical formulations employing tripropylene melamine as a curing agent. The formulations are tabulated in Table II.

TABLE II

| Mixture number | 7 | 8 | 9 | 10 | 11 | 12 |
|---|---|---|---|---|---|---|
| Beryllium (grams) | 2.25 | 2.25 | 2.25 | 2.25 | 2.25 | 2.25 |
| Prepolymer (grams): | | | | | | |
| Butarez I | 2.05 | 2.05 | | | | |
| Hycar CTPB | | | 2.00 | 2.00 | | |
| HX730 | | | | | 1.85 | 1.85 |
| Curative (grams) | | | | | | |
| HAT | .085 | | .150 | | .275 | |
| Tripropylene melamine | | .085 | | .150 | | .275 |
| Ammonium nitrate (grams) | 0.5 | 0.5 | 0.5 | 0.5 | 0.5 | 0.5 |
| Hours cure | 96 | 96 | 72 | 72 | 48 | 48 |

Once again, compositions 2, 4, and 6 are found to have a good cure; compositions 1, 3, and 5 are gummy and unsatisfactorily cured.

EXAMPLE III

Using the procedure of Examples 1 and 2, mixtures of HMAT and HAT are prepared and then compared to triethylene melamine in carboxy polymer formulations containing guanidinium nitrate. Beryllium hydride is also present in the formulations of this example. The formulations are tabulated in Table III.

TABLE III

| Mixture Number | 13 | 14 | 15 | 16 | 17 | 18 |
|---|---|---|---|---|---|---|
| Beryllium hydride | 2.25 | 2.25 | 2.25 | 2.25 | 2.25 | 2.25 |
| Prepolymer: | | | | | | |
| Butarez I | 2.05 | 2.05 | | | | |
| Hycar CTPB | | | 2.00 | 2.00 | | |
| HX730 | | | | | 1.85 | 1.85 |
| Curative: | | | | | | |
| HAT | .045 | | .09 | | .085 | |
| HMAT | | .05 | | .055 | | .165 |
| Triethylene melamine | .095 | | .154 | | .250 | |
| Guanidinium nitrate | 15.0 | 15.0 | 15.0 | 15.0 | 15.0 | 15.0 |
| Hours cure | 96 | 96 | 72 | 72 | 48 | 48 |

As before, compositions 2, 4, and 6 are found to have good cure; compositions 1, 3, and 5 are gummy and unsatisfactorily cured.

EXAMPLE IV

A solid rocket propellant was made according to the following procedure: 45 parts Telagen CT, a General Tire carboxy terminated polybutadiene having a 0.040 equivalence per 100 grams of prepolymer; 12 parts isodecyl pelargonate, used as a plasticizer; and 3 parts HMAT, hexa[1-(2-methyl) aziridinyl] triphosphatriazine, were mixed for ten minutes under vacuum at room temperature. Then 60 parts beryllium hydride; 70 parts hydrazinium nitrate; and 33 parts ammonium nitrate, which were previously mixed, were added while mixing was continued. After 15 minutes 77 parts of ammonium perchlorate were added, vacuum was applied, and mixing continued for an additional 15 minutes. The product was cured at ambient temperature for 48 hours to produce a solid propellant having good performance and favorable physical properties.

It will be understood that it is intended to cover all changes and modifications of the examples of the invention herein chosen for the purpose of illustration which do not constitute departures from the spirit and scope of this invention.

I claim:
1. The process of curing a prepolymer composition comprising:
   mixing a carboxy terminated or substituted prepolymer and from 10 percent to 90 percent, by weight of the composition, of a nitrate salt with a compound selected from a group consisting of hexa[1-(2-methyl) aziridinyl] triphosphatriazine, hexa(1-aziridinyl) triphosphatriazine, and mixtures thereof; and
   maintaining a temperature of between 10° C. and 150° C.; and
   curing the reactants within said temperature range between 20 and 100 hours.
2. The process of claim 1 wherein the prepolymer is a carboxy terminated linear polybutadiene and the nitrate salt is selected from the group consisting of potassium nitrate, ammonium nitrate, guanidinium nitrate and mixtures thereof.
3. A prepolymer composition comprising:
   from 9 percent to 87 percent of a carboxy terminated or substituted prepolymer;
   from 10 percent to 90 percent, by weight of the composition of nitrate salt;

and from 0.5 percent to 3 percent of a compound selected from the group consisting of hexa[1-(2-methyl) aziridinyl] triphosphatriazine, hexa-(1-aziridinyl) triphosphatriazine and mixtures thereof.

4. The prepolymer composition of claim 3 wherein the prepolymer is a carboxy terminated linear polybutadiene and the nitrate salt is selected from the group consisting of potassium nitrate, ammonium nitrate, guanidinium nitrate, hydrazinium nitrate, and mixtures thereof.

5. The composition of claim 3 additionally comprising from 3 percent to 25 percent of a fuel compound selected from the group consisting of aluminum, beryllium, and beryllium hydride.

References Cited

UNITED STATES PATENTS

| | | |
|---|---|---|
| 3,087,844 | 4/1963 | Hudson et al. _____ 149—19 |
| 3,147,161 | 9/1964 | Abere et al. _____ 149—19 |
| 3,177,101 | 4/1965 | Vriesen _____ 149—19 |
| 3,257,248 | 6/1966 | Short et al. _____ 149—19 |
| 3,305,523 | 2/1967 | Burnside _____ 149—19 |

BENJAMIN R. PADGETT, Primary Examiner

U.S. Cl. X.R.

149—20, 44